J. FLECKENSTEIN.
LIQUID MEASURING AND DISPENSING APPARATUS.
APPLICATION FILED JAN. 5, 1918.
1,405,827.
Patented Feb. 7, 1922.
4 SHEETS—SHEET 2.
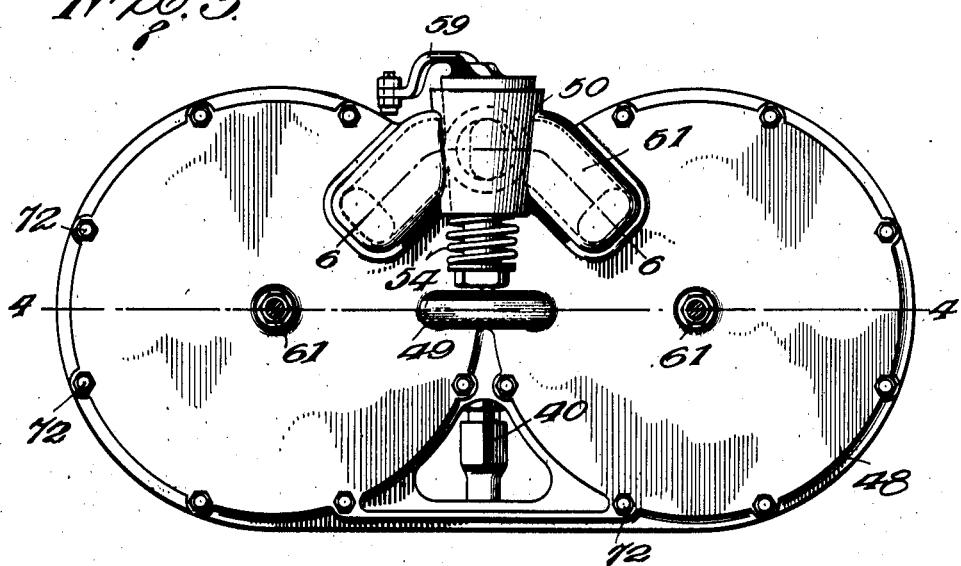
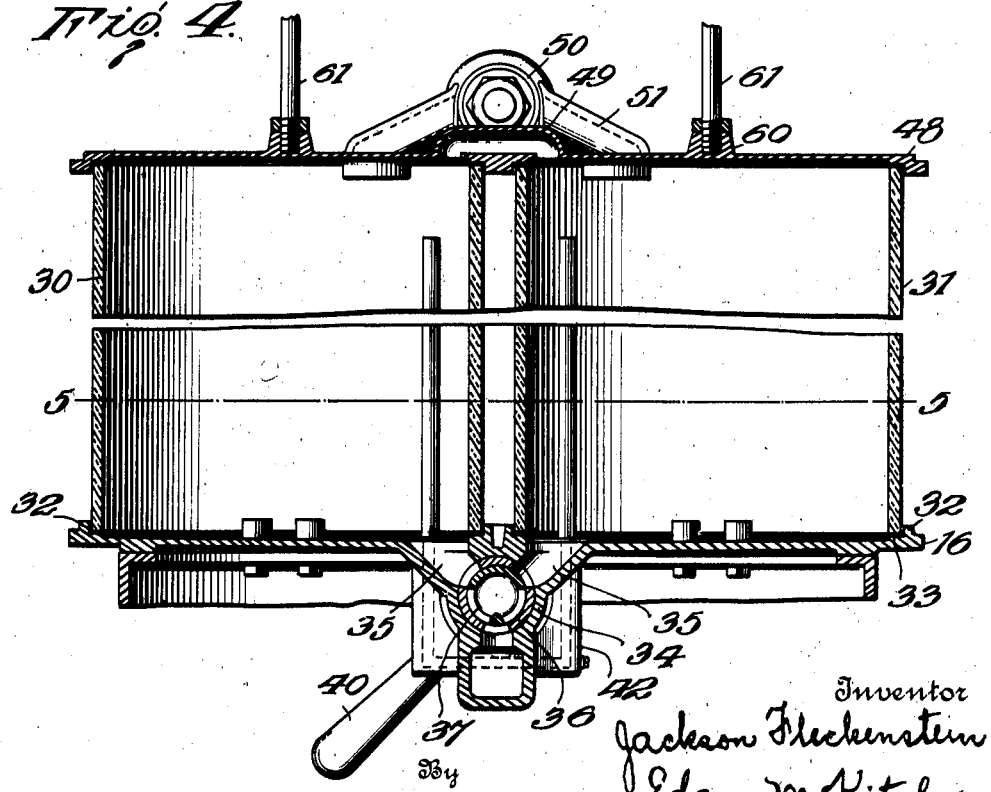
Inventor
Jackson Fleckenstein
By Edgar M. Kitchin
Attorney J. FLECKENSTEIN.
LIQUID MEASURING AND DISPENSING APPARATUS.
APPLICATION FILED JAN. 5, 1918.
1,405,827.
Patented Feb. 7, 1922.
4 SHEETS—SHEET 3.
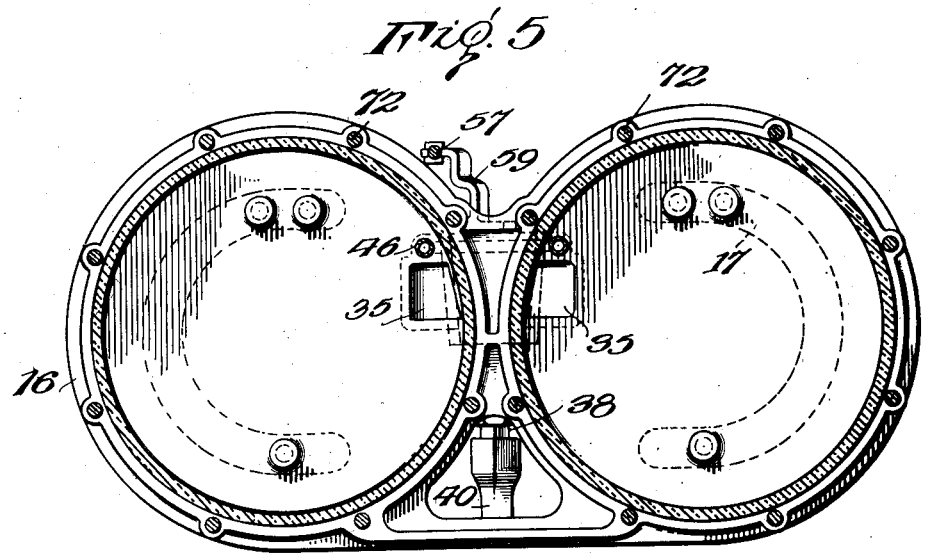
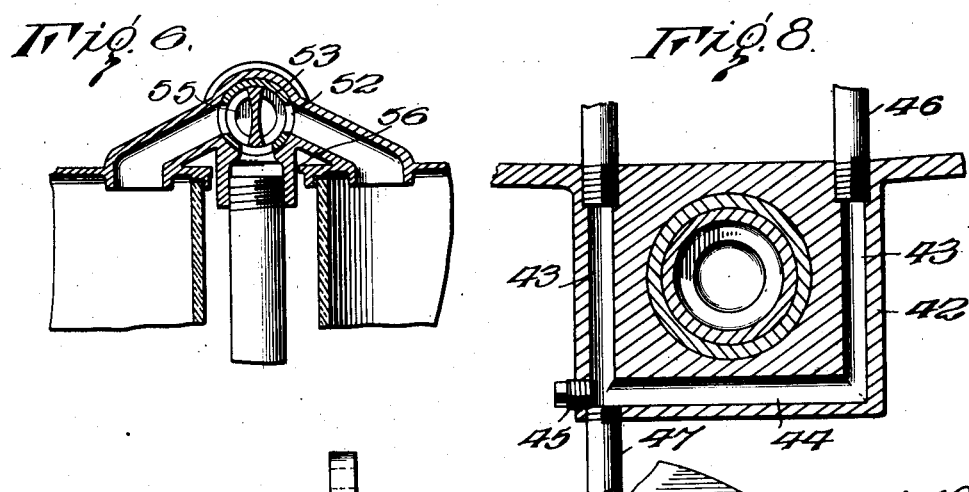
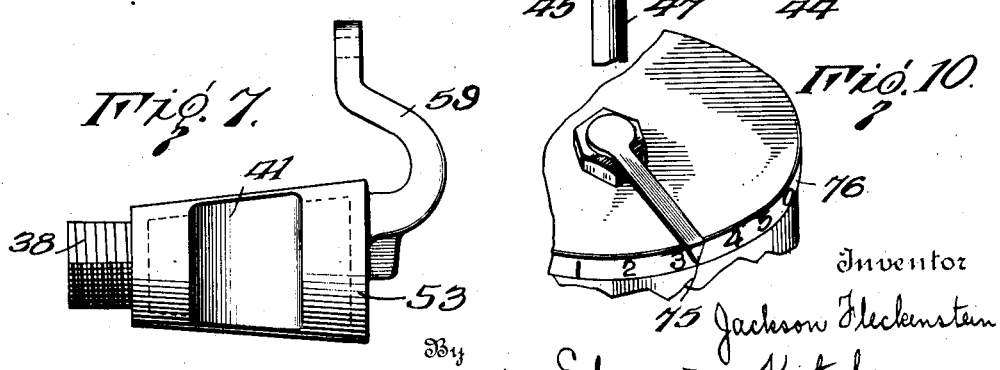
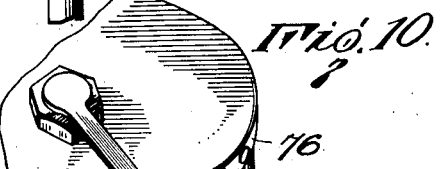

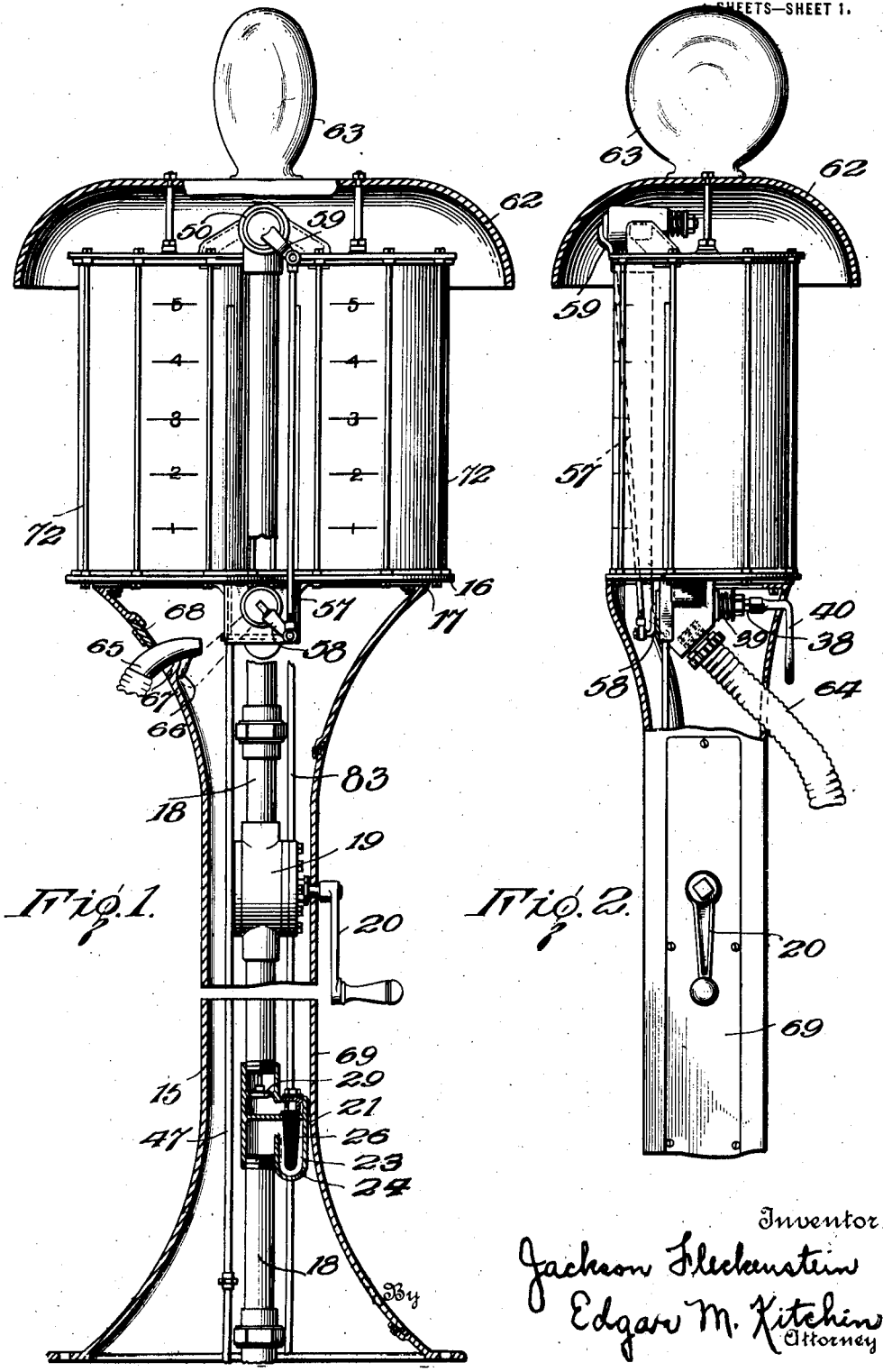

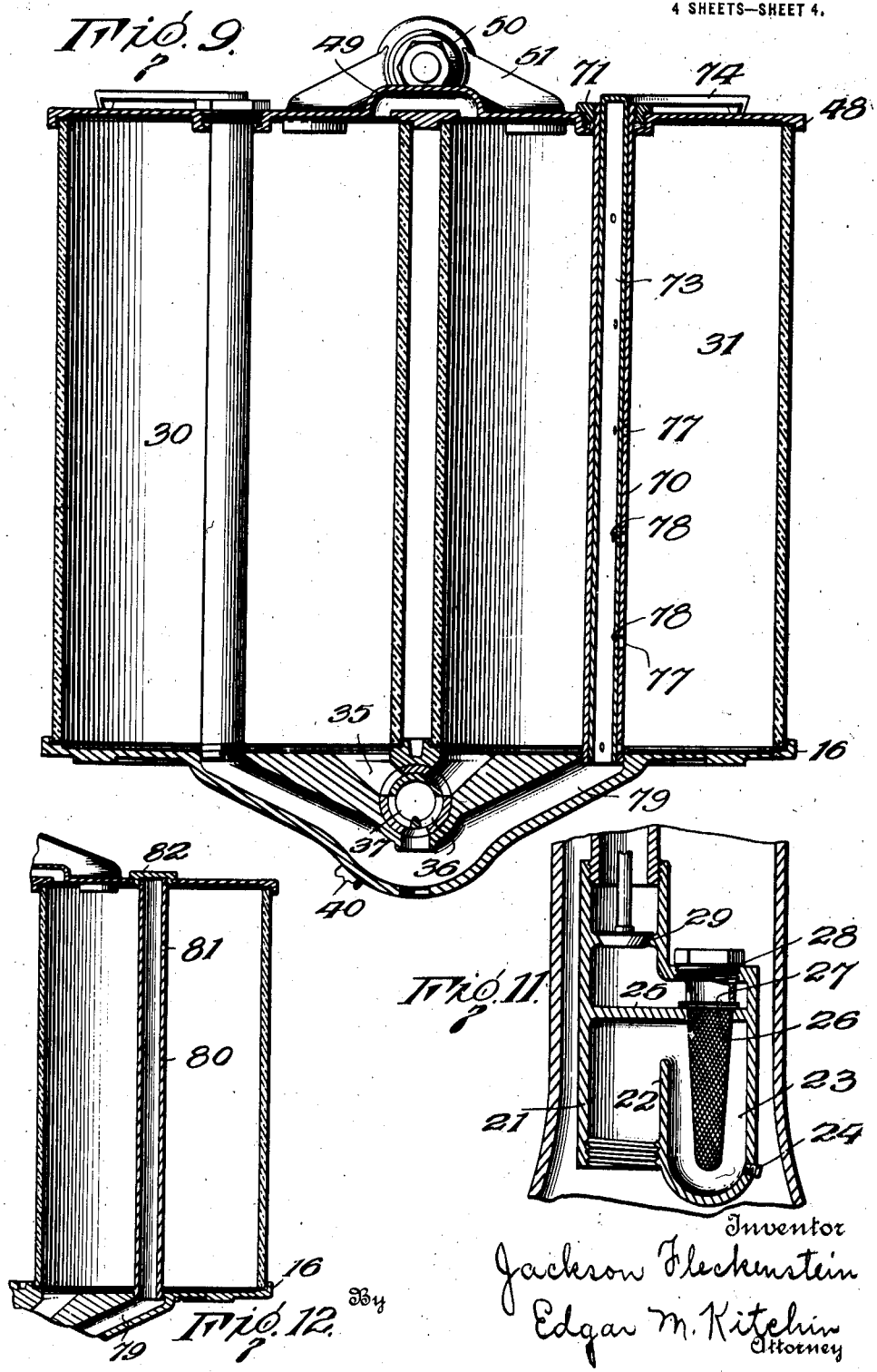

UNITED STATES PATENT OFFICE.

JACKSON FLECKENSTEIN, OF IONIA, MICHIGAN, ASSIGNOR TO FLECKENSTEIN VISIBLE GASOMETER COMPANY, OF GRAND RAPIDS, MICHIGAN, A CORPORATION OF DELAWARE.

LIQUID MEASURING AND DISPENSING APPARATUS.

1,405,827.  Specification of Letters Patent.  Patented Feb. 7, 1922.

Application filed January 5, 1918. Serial No. 210,445.

*To all whom it may concern:*

Be it known that I, JACKSON FLECKENSTEIN, a citizen of the United States, residing at Ionia, in the county of Ionia and State of Michigan, have invented certain new and useful Improvements in Liquid Measuring and Dispensing Apparatus; and I do hereby declare the following to be a full, clear, and exact description of the invention, such as will enable others skilled in the art to which it appertains to make and use the same.

The present invention relates to liquid measuring and dispensing apparatus, and more particularly to that type adapted for use in dispensing motive fluid, such as gasoline, in predetermined quantities.

The object is to provide a structure embodying means for elevating a stream of liquid from a source of supply, filtering the liquid in its passage into the device, continuously measuring the liquid in desired quantities, and continuously discharging the measured quantities of the liquid.

Another object is to provide a structure of measuring and dispensing apparatus embodying an adjustable overflow associated with one or more containers employed and which determine the quantity of the liquid delivered to the containers to accurately measure the quantity of the liquid and return the excess liquid to the source of supply after the predetermined quantity has been delivered to the container.

A further object of the present invention is to embody in a post or standard certain details of construction wherein access may be readily gained to the pump, valves and other operating mechanism employed, and wherein the discharge nozzle may be housed and locked to prevent tampering with the device when not in use.

With these and further objects in view, as will in part hereinafter become apparent and in part be stated, the invention comprises certain novel constructions, combinations and arrangements of parts as subsequently specified and claimed.

In the accompanying drawings,—

Figure 1 is a vertical central section taken through a measuring and dispensing apparatus constructed according to the present invention, certain parts being shown in elevation and certain parts being broken away.

Figure 2 is a similar view taken at right angles to the showing in Figure 1.

Figure 3 is a top plan view of the apparatus, the hood being removed.

Figure 4 is a fragmentary vertical section taken through the containers substantially on the plane indicated by line 4—4 of Figure 3, and showing in section the discharge valve and its communicating ports with the independent containers.

Figure 5 is a transverse section taken through the containers on the plane indicated by line 5—5 of Figure 4, and looking downwardly toward the discharge valve.

Figure 6 is a fragmentary vertical section through the inlet valve, showing its communication with the upper ends of the independent containers.

Figure 7 is a detail side elevation, enlarged, of the intake valve plug.

Figure 8 is a vertical section taken through the discharge valve in the plane of the overflow passages.

Figure 9 is a vertical section taken through the containers and the discharge valve therefor, showing a modified form of overflow and discharge for the containers.

Figure 10 is a fragmentary perspective view of one end of the top plate showing the overflow adjusting arm which is mounted thereon.

Figure 11 is a fragmentary vertical section through the filter employed.

Figure 12 is a vertical section taken through one of the containers and showing a further modified form of overflow applied thereto.

Referring to the drawings, wherein like parts are designated by similar characters of rerefence throughout the several views, 15 designates a hollow standard which is preferably cast and provided with a flaring base portion adapted to be anchored in any suitable manner upon a cementitious or other suitably formed base, and above a liquid supply tank from which liquid to be dispensed and measured may be drawn. The upper end of the standard 15 is also preferably flared and provided with an inturned flange adapted to engage beneath a base plate 16, the latter having depending ribs 17 conforming to the curvature of the standard to hold the base plate 16 from lateral or endwise displacement. A supply pipe 18 rises through the standard and is provided at a suitable point with a pump 19 housed in the standard and provided preferably with a detachable hand crank 20 for use in operating the pump to lift the liquid through the pipe 18 from the source of supply. The supply pipe 18 is provided with a filter, preferably below the pump 19, and which may be of the construction shown in detail in Figure 11. In this instance, the filter comprises a casting 21 threaded at its lower end and at one side to receive the lower supply pipe section and having a partition 22 spaced from the wall at said side of the casting to form at the other side of the casting a trap 23 into which sediment, water, and other foreign substances may be collected. The trap 23 is provided with a removable plug 24 in its lower end through which the accumulations may be withdrawn. A web 25 is formed in the casting 21 above the inlet of the casting and is adapted to deflect the rising liquid into the trap 23. The web 25 is suitably apertured to receive therethrough a depending filtering body 26 which may comprise a suitably treated fabric, screen or the like, having a shoulder at its upper end seating upon the web 25 for suspending the filter 26 in the trap 23. A thin mesh disc 27 is placed over the upper end of the filter 26 and held thereto by a hollow plug 28 which is detachably secured in the casting 21 and substantially in axial alinement with the trap 23. Upon the removal of the plug 28 the filter 26 may be readily withdrawn and replaced. The casting 21 has its outlet in axial alinement with the inlet, the web 25 being arranged between the inlet and the outlet. A foot valve 29 is seated in the outlet and is adapted to support the column of liquid raised by the pump into the supply pipe 18.

The base plate 16 is adapted in the present instance to support two containers 30 and 31 which are formed preferably of transparent material admitting of inspection of the contents of the containers as the latter are filled and emptied. The base plate 16 is provided at opposite ends with upstanding ribs 32 forming seats within which the lower ends of the containers are adapted to engage, a packing washer 33 being disposed against the lower end of each container to seal the same upon the plate. The plate 16 is preferably in the form of an integral casting and has as a part thereof an intermediate depending enlargement 34 which is suitably bored and finished to form a valve casing provided with ports 35 leading in opposite directions toward the containers 30 and 31 and opening through the base plate 16 into the containers. A bushing or lining 36 of brass or other suitable material is placed in the valve casing 34 and forms a bearing for a turning plug 37. As substantially shown in Figure 7, this turning plug is made in one piece with a shank 38 on its reduced end adapted to project from the casing 34 and receive a spring 39 thereover tensioning the turning plug 37 in the casing, the shank 38, in the case of the lower valve, having a rectangular head upon its outer extremity to receive a detachable handle 40 thereon. The body of the turning plug 37 has at opposite sides concavities 41 forming the ports of the valve and adapted to register alternately with the ports 35 which lead to the independent containers 30 and 31. The valve casing 34 is provided, near one end, with an exterior web 42 of preferably rectangular contour, and which, as shown in Figure 8, is bored to provide vertical passages or channels 43, and a transverse channel or passage 44 joining the lower ends of the vertical passages and closed at one side of the web 42 by a removable plug 45. The plug 45 closes the opening necessarily formed in boring the web 42 and forming the lower passage 44. The vertical passages 43 open through the top of the plate 16 and receive in threaded engagement therein overflow pipes 46 which extend upward in the containers 30 and 31. The pipes 46 are of a height adapted to receive the liquid in their upper ends when the liquid rises to a predetermined height, such as to the five-gallon height, in the containers. The web 42 is connected at its lower end to a return pipe 47 which is preferably carried down through the standard 15 to the source of supply for returning the overflow thereto.

The containers 30 and 31 are surmounted by a top plate 48, which is in the form of an integral casting adapted to extend over both of the containers to close the same, and which is provided with a hollow upstanding web 49 establishing communication between the upper ends of the containers for equalizing fluid pressure therein, and which is provided with a second web 50 shaped and bored to the configuration of a valve casing and having hollow branches 51 forming ports leading from the valve casing to the upper ends of the containers 30 and 31. The valve casing 50 is fitted with a bushing 52 of relatively soft metal to form a bearing for a turning plug 53 of substantially the same structure as shown in Figure 7. The turning plug 53 is tensioned by a spring 54 in the casing 50 and is provided with ports 55 adapted to open into the ports 51.

The upper valve 50 comprises the inlet valve and has a depending threaded extension 56 at its under side and which projects downwardly between the containers 30 and 31 at one side of the apparatus to receive the upper end of the supply pipe 18 therein. The lower valve 34 comprises the discharge valve and is preferably arranged midway between the opposite sides of the apparatus and out of line with the supply pipe 18. The operating handle 40 is connected to the lower valve, and the valves are connected for simultaneous operation by a connecting rod 57 and crank arms 58 and 59 carried respectively upon the turning plugs 37 and 53. The lower arm 58 is mounted upon the outer end of the turning plug and extends radially therefrom in substantially a straight line, while the upper arm 59 is mounted upon the outer end of the turning plug 53 but is returned about the outer end of the casing 50 to approach the vertical plane of the lower arm 58. The arms 58 and 59 extend in the same direction from their respective valves and are adapted to move simultaneously when one of the valves is operated. The turning plugs of the respective inlet and discharge valves are so arranged that when one of the ports 55 of the inlet valve is in communication with the supply pipe and the inlet port 51 of one of the containers, the port 41 of the discharge valve is closed to the discharge port of the lower casing 34. The valves thus alternately open and close the containers to the supply and discharge pipes and effect the intermittent filling and discharge of each container.

The top plate 48 is provided with upstanding threaded bosses 60 into which are threaded the lower ends of posts 61 adapted to support upon their upper ends a hood or cover 62, which is preferably spaced above the containers and preferably spaced about the containers at its lower edge. A globe 63 of translucent or other suitable material may be mounted upon the hood 62 to receive a lamp or other device therein for attracting attention to the apparatus. Electric wiring used may be housed in the conduit 83 extending up through the standard in any suitable manner.

The discharge valve 34 has the outlet port thereof connected to a flexible tube or pipe 64, which may be of the usual construction and provided upon its free end with a nozzle 65 having a returned finger 66 upon its outer end, and at its lower side forming a hook which may be engaged over a lip 67 cast or otherwise suitably formed upon the inner wall of the standard 15. The standard 15 is suitably apertured to receive the nozzle 65 therein sufficient to engage the hook 66 with the lip. A hinged door or closure 68 is mounted in the adjacent side of the standard and is recessed to fit against the upper side of the nozzle to prevent, when the door is closed, the lifting of the nozzle from the lip 67. The door may be locked or otherwise suitably secured in closed position to prevent tampering with the nozzle when the device is not in use. The standard 15 is also provided with a removable cover plate 69 arranged on one side opposite the pump 19, filter 21, and the various other parts of the apparatus, to admit ready access to the same.

The overflow of the liquid in the containers when the liquid rises to a predetermined height therein may be accomplished by the means disclosed in Figures 9 and 10. In this construction, each container is provided with a hollow tube 70 which is threaded at its lower end into the base plate 16 and is secured at its upper end to the top plate 48 by a bushing 71 in threaded engagement with the tube 70 and with the top plate. The tube 70 may be employed for securing the top plate 48 against the containers 30 and 31, in lieu of the rods 72 disclosed in Figure 1. The tube 70 is open at its upper end and receives therein an inner tube 73, the latter having an arm 74 on its upper end which projects radially from the tube 73 over the top plate 48, and which may be provided with a depending pointer finger 75 adapted to traverse a graduated scale 76 formed upon the edge of the top plate 48. This construction is provided for each container, and the outer tube 70 has perforations or slots 77 at suitable heights, such as at one, two, three, four and five gallon heights, and at the bottom of the container. The inner tube 73 is provided with openings 78 formed in the sides of the tube out of vertical register and adapted to be brought one at a time, by the turning of the tube 73, into register with their respective openings 77 to overflow the container at the desired surface level of the liquid. The arm 74 is adapted to be swung into the desired position relatively to the scale 76 to adjust the desired openings into register. In this construction the enlargement of the base plate 16 is formed with discharge ports 79 which lead to the lower ends of the tubes 70 for receiving the overflow and conducting the same to the return pipe 47.

In Figure 12 there is shown a further modification of the overflow, wherein a tube 80 is threaded at its lower end into the base plate 16 and adapted to communicate with the return port 79. The tube 80 has near its upper end, and at one elevation only, an outlet opening 81 arranged preferably at a five-gallon height to discharge an excess quantity of fluid into the tube 80. The upper end of the tube is secured to the top plate 48 by a cap 82 which is threaded over the tube 80 and into the top plate.

In view of the foregoing, it is believed that the operation will be fully understood, for when it is desired to dispense the liquid it is only necessary to operate the pump 19 and raise the liquid through the supply pipe 18, the filter 21, and into the inlet valve 50. As the inlet valve 50 opens into the containers 30 and 31, one at a time, the liquid is directed into the container which is open to the valve. The discharge to this container is closed and the container is filled until the required height of the column of liquid is reached, when the excess liquid passes into the overflow. As above described, the overflow may be of the permanent type shown in Figures 1 and 12, or may be adjustable as shown in Figure 9, to overflow the liquid at the desired height. As soon as the desired quantity is fed into the said container, the valves are shifted by moving the handle 40 and the incoming liquid is then directed to the other container and the discharge closed to the other container and opened to the first container. The liquid is now permitted to flow from the first container to the flexible pipe 64 and out through the nozzle 65 thereof. In the meantime, the second container is being filled to the desired extent and the contents thereof are in condition to be discharged as soon as the first container is empty.

When the device is not in use, the nozzle 65 may be inserted in the standard 15 and secured therein by the door 68. It will be observed that by virtue of the apertured web 49 and the overflow passages 43 and 44, a free circulation of air is permitted in the independent containers so that the liquid is permitted to readily flow into and out of the same.

What I claim is:—

1. In measuring and dispensing apparatus, the combination of a container, top and bottom plates closing the container, a pipe arranged in the container and connecting the said plates, the said pipe having openings therein for overflow of excess liquid within the container, and means for closing the openings for varying the extent of overflow.

2. In measuring and dispensing apparatus, the combination of a container, top and bottom plates therefor, a pipe arranged within the container and connecting the plates, a tubular valve within the pipe and having an operating handle extending to a point accessible exteriorly of the container, the pipe being formed with openings at different elevations adapted to be opened and closed by manipulations of the valve.

3. In measuring and dispensing apparatus, the combination, of a pair of containers, top and bottom plates adapted to close the upper and lower ends of the containers, an inlet valve carried upon the top plate and arranged at one side of the apparatus, a discharge valve carried by the bottom plate and arranged beneath the inlet valve, a supply pipe rising at one side of the apparatus and communicating with said inlet valve, a discharge pipe leading from said discharge valve, said valves having operating arms upon their outer ends arranged in offset relation with respect to the ends of the valves to approach a common vertical plane, a rod connecting said arms to move the valves simultaneously, and operating means for the valves.

4. In measuring and dispensing apparatus, the combination of a hollow standard, a supply pipe rising through the standard, a pump in the supply pipe, a detachable handle for the pump adapted to be located exteriorly of the standard, a filter interposed in the supply pipe and arranged in the standard and including a trap portion adapted to collect sediment from the liquid, said standard having a removable side plate admitting access to said trap and to the pump, containers mounted upon said standard, and means controlling the admission of fluid from said supply pipe to the containers.

5. In measuring and dispensing apparatus, the combination, of a pair of containers, top and bottom plates closing the upper and lower ends of the containers, a pipe projecting through each container and secured at opposite ends to said plates for binding the latter against the tops and bottoms of the containers, said pipes each having an opening in its side at a predetermined height to overflow excess quantities of liquid in the containers, and a return pipe connected to said pipes in the containers for carrying off the overflow liquid.

6. In measuring and dispensing apparatus, the combination, of a pair of containers, top and bottom plates closing the containers, pipes arranged in the containers and secured at opposite ends to said plates for binding the latter in place, inner pipes arranged within said first pipes and having arms extending over the top plate to the marginal edge thereof, said pipes having openings therein adapted to be brought into register, one pair at a time, upon the swinging of said arms to admit overflow of liquid from the containers into the pipes when excess liquid is delivered to the containers beyond a predetermined height, and graduated scales carried upon the top plate over which said arms are adapted to traverse for determining the positions of said pipes.

7. In measuring and dispensing apparatus, the combination, of a plurality of containers, top and bottom plates closing the containers and including inlet and discharge valves, said top plate having inlet ports leading from the valve to the containers, and having an air equalizing passage opening into the containers, said bottom plate having discharge ports leading from the containers to the adjacent valve and having overflow ports leading from the containers to a position beneath the valve, a return pipe connected to the bottom plate and communicating with said overflow ports, a distributing pipe connected to said discharge valve for receiving liquid therethrough from the containers, and means for operating said inlet and discharge valves.

8. In measuring and dispensing apparatus. the combination of a hollow standard, liquid dispensing means supported on the standard, a flexible discharge pipe connected to said means and having a nozzle on its free end, a door closing one side of said standard, the door and the wall of the standard having complemental notches forming an opening adapted to receive said nozzle therein when the door is open, and said wall of the standard having at the lower part of the opening an inwardly and upwardly inclined lip, said nozzle provided on its under side with a downwardly returned hook adapted to engage said lip when the nozzle is engaged in the opening, said door when closed being adapted to hold said hook against the lip.

In testimony whereof I affix my signature in presence of two witnesses.

JACKSON FLECKENSTEIN.

Witnesses:
 WESLEY G. FOLGER,
 STANLEY G. SMITH.